United States Patent [19]

Muto et al.

[11] Patent Number: 5,520,126
[45] Date of Patent: May 28, 1996

[54] EMBROIDERY DATA PREPARING DEVICE FOR MAT-TYPE STITCHES

[75] Inventors: Yukiyoshi Muto; Masao Futamura; Masahiro Mizuno, all of Nagoya, Japan

[73] Assignee: Brother Kogyo Kabushiki Kaisha, Nagoya, Japan

[21] Appl. No.: 493,318

[22] Filed: Jun. 21, 1995

[30] Foreign Application Priority Data

Aug. 11, 1994 [JP] Japan ..................... 6-211856

[51] Int. Cl.⁶ .............. D05B 21/00; D05C 9/06
[52] U.S. Cl. ................ 112/102.5; 112/470.04
[58] Field of Search ............. 112/102.5, 470.04, 112/470.06, 453, 457, 475.19; 364/470

[56] References Cited

U.S. PATENT DOCUMENTS 5,204,822  4/1993  Asano ................ 112/102.5 X
5,311,439  5/1994  Hayakawa et al. ............ 112/102.5 X
5,410,976  5/1995  Matsubara ............ 112/102.5

FOREIGN PATENT DOCUMENTS 2-49685  2/1990  Japan .

*Primary Examiner*—Peter Nerbun
*Attorney, Agent, or Firm*—Oliff & Berridge

[57] ABSTRACT

In an embroidery data preparing device, after an embroidery figure is blocked and a stitch order for the blocks is determined, it is judged whether the stitch terminal end portions of continuous embroidery blocks are adjacent to one another. If the stitch terminal end portions are not adjacent to one another, needle location points for mat-type stitches are calculated from a stitch start side. If the stitch terminal end portions are adjacent to one another, needle location points for mat-type stitches are calculated from a stitch terminal side for the block. Accordingly, mat-type stitch needle location lines which are obtained as virtual lines over plural blocks by needle points for mat-type stitches can be made continuous over the blocks even when the stitch advancing direction is different between the blocks.

18 Claims, 17 Drawing Sheets

| STITCH-END INFORMATION NUMBER | STITCH TERMINAL END POINT COORDINATE | STITCH ADVANCING DIRECTION | LAST NEEDLE LOCATION POINT | MAT-TYPE STITCH TERMINATING PITCH (L3) | FINAL MAT-TYPE STITCH DIRECTION (F) |
|---|---|---|---|---|---|
| 1 | G5 G6 | P DIRECTION | G6 | e | -1 |
| 2 | | | | | |
| 3 | | | | | |
| 4 | | | | | |

Fig.14

| BLOCK CODE DATA | |
|---|---|
| DATA OF EMBROIDERY BLOCK B1 | G1 (STITCH START END POINT) |
| | G2 |
| | G3 |
| | G4 (STITCH TERMINAL END POINT) |
| DATA OF EMBROIDERY BLOCK B2 | G3 (STITCH START END POINT) |
| | G4 |
| | G5 |
| | G6 (STITCH TERMINAL END POINT) |
| RUNNING STITCH CODE DATA | |
| RUNNING STITCH DATA ( G6 → G7 ) | |
| BLOCK CODE DATA | |
| DATA OF EMBROIDERY BLOCK B3 | G6 (STITCH START END POINT) |
| | G5 |
| | G8 |
| | G7 (STITCH TERMINAL END POINT) |

EMBROIDERY DATA PREPARING DEVICE FOR MAT-TYPE STITCHES

BACKGROUND OF THE INVENTION

1. Field of the Invention

The invention relates to an embroidery data preparing device, and particularly to an embroidery data preparing device for preparing mat-type stitch data with which a mat-type stitch pattern is formed so as to be continuous over a plurality of embroidery blocks even when the stitch terminal end portion of each embroidery block is adjacent to the stitch terminal end portion of an embroidery block which is subsequent to the embroidery block.

2. Description of Related Art

When embroidery stitch data, with which a figure, such as a one-point mark or the like, is embroidered on an article in a mat-type stitch mode using a conventional industrial embroidery-sewing machine, are prepared, outline data of the embroidery figure are first prepared and then embroidery stitch data for mat-type stitches are prepared on the basis of the outline data.

For example, the outline of an embroidery figure 30A, as shown in FIG. 19, is assumed to be divided into three embroidery blocks B1 to B3, each of which comprises a rectangular sectioned area. The block data of each of the embroidery blocks B1 to B3 are constructed by four definition end points G1–G4, G3–G6 or G5–G8. The two definition end points G1,G2 serve as stitch start end points for the embroidery block B1, and the two definition end points G3,G4 serve as stitch terminal end points for the embroidery block B1 and as stitch start end points for the embroidery block B2. Furthermore, the two definition end points G5,G6 serve as stitch terminal end points for the embroidery blocks B2,B3, and the two definition end points G7,G8 serve as stitch start end points for the embroidery block B3.

That is, in order to set the last needle location of the embroidery figure 30A to the definition end point G6, the stitch advancing direction of each of the embroidery block B1 and the embroidery block B2 is set to a direction as indicated by an arrow P. Furthermore, running stitch data are provided from the definition end point G6 to the definition end point G7, and the stitch advancing direction of the embroidery block B3 is set to a direction as indicated by an arrow Q which is opposite to the direction P. A line segment G1–G5 of the two embroidery blocks B1,B2 which will be embroidered to be continuous with each other is equi-sectioned on the basis of the density of thread to obtain plural end points g1, g2, g3, . . . , g10, and a line segment G2–G6 is also equi-sectioned on the basis of the density of thread to obtain plural end points g21, g22, g23, . . . , g30.

Likewise, plural end points g41, g42, . . . , g46 on a line segment G7-G5 and plural end points g51, g52, . . . , g56 on a line segment G8-G6 are obtained. On the basis of a mat-type stitch pitch and a displacement rate of mat-type stitches which are preset, mat-type stitch needle location data (embroidery stitch data) to obtain a prescribed mat-type stitch pattern are prepared with the end points g and the mat-type needle location points t as described above in this order: G1, t1, t2, t3, g21, t4, t5, t6, g1, t7, tS, g22, . . . , g5, t29, t30, G4, . . . , g10, . . . , t60, G6, the running stitch data (G6–G7), t201, t202, t203, g51, . . . , g46, . . . , t238, and G6. At this time, in the embroidery blocks B1 and B2, mat-type stitch needle location lines TH1–TH8 are shown (i.e., are shown as virtual lines) with neighboring needle location points, on the needle location lines, are oblique to the stitch advancing direction P at a predetermined angle. In the embroidery block B3, mat-type stitch needle location lines TH20–TH26 are likewise oblique to the stitch advancing direction Q at a predetermined angle, in this example the angle is the same in all blocks.

Accordingly, over embroidery blocks which are continuous with each other substantially in the same stitch advancing direction, the virtual lines are formed to be continuous with one another with the mat-type stitch needle location points as shown in FIG. 19. That is, a mat-type stitch pattern comprising the virtual lines is maintained over the blocks.

As described above, in order to prepare the embroidery stitch data with which the embroidery figure 30A is embroidered in the mat-type stitch mode, the outline of the embroidery figure is divided into the three embroidery blocks B1 to B3, each comprising a rectangular sectioned area, and the mat-type stitch needle location data (embroidery stitch data) to form the predetermined mat-type stitch pattern are obtained from a sewing start side for every group of the embroidery blocks (a group of B1 and B2, a group of B3) for the embroidery blocks B1,B2 whose stitch advancing directions are substantially identical to each other and the embroidery block B3 whose stitch advancing direction is opposite to the above direction. Therefore, when the end portion of the embroidery blocks B1,B2 (which belong to the first embroidery block group) is adjacent to the end portion of the embroidery block B3 (which belongs to the next embroidery block group), the mat-type stitch needle location lines TH6–TH8 of the first embroidery blocks B1,B2 and the mat-type stitch needle location lines TH23–TH26 are not continuous with each other and, thus, discontinuous at the adjacent portion of the blocks. That is, the mat-type stitch pattern is broken. Therefore, a beautiful mat-type stitch embroidery cannot be formed.

SUMMARY OF THE INVENTION

An object of the invention is to provide an embroidery data preparing device for preparing mat-type stitch data to form a mat-type stitch pattern which is continuous over a plurality of embroidery blocks and pleasing in appearance even when the stitch terminal end portion of each of a series of embroidery blocks to be embroidered is adjacent to the end portion of a subsequent embroidery block.

According to a first aspect of the invention, an embroidery data preparing device for preparing embroidery stitch data to embroider an embroidery figure on an article, which includes embroidery data preparing means for preparing embroidery stitch data, the embroidery figure being divided into plural neighboring areas to form embroidery blocks and a stitching operation being advanced every embroidery block from a stitch start side of the embroidery block toward a stitch terminal side thereof on the basis of embroidery block data specified by the embroidery block, is characterized by including first mat-type stitch data preparing means for preparing mat-type stitch needle location data on the basis of the embroidery stitch data received from the embroidery data preparing means to embroider a prescribed mat-type stitch pattern over one or more embroidery blocks which are continuous with one another and have substantially the same stitch advancing direction when the stitch terminal end portions of each embroidery block and an embroidery block subsequent thereto are not adjacent to each other, and second mat-type stitch data preparing means for preparing mat-type stitch needle location data to embroider a mat-type stitch pattern continuous with a prescribed mat-type stitch pattern with its stitch advancing direction inverted, on the basis of the embroidery stitch data received from the embroidery data preparing means for one or plural embroidery blocks which contain a subsequent embroidery block and have substantially the same stitch advancing direction when the stitch terminal end portions of each embroidery block and the embroidery block subsequent thereto are adjacent to each other.

According to a second aspect of the invention, the embroidery data preparing device may be equipped with stitch terminal end portion judging means for judging whether the stitch terminal end portion of each embroidery block is adjacent to the stitch terminal end portion of a subsequent embroidery block. In this case, one of the first mat-type stitch data preparing means and the second mat-type stitch data preparing means may be selectively actuated in accordance with the judgment result of the stitch terminal end portion judging means.

In the embroidery data preparing device according to the first aspect of the invention, the embroidery data preparing means prepares the embroidery stitch data to perform an embroidery so that the stitch is advanced from the stitch starting side of the embroidery block toward the stitch terminating side thereof, for each of embroidery blocks obtained by dividing an embroidery figure into plural sectioned areas and on the basis of each embroidery block data defining each embroidery block. When the stitch terminal end portion of each embroidery block is not adjacent to the stitch terminal end portion of an embroidery block subsequent thereto, the first mat-type stitch data preparing means is instructed to be actuated. In this case, for one or plural continuous embroidery blocks whose stitch advancing directions are substantially identical to each other, the first mat-type stitch data preparing means obtains the mat-type stitch needle location data to embroider a prescribed mat-type stitch pattern on the basis of the embroidery stitch data received from the embroidery data preparing means. On the other hand, when the stitch terminal end portion of each embroidery block is adjacent to the stitch terminal end portion of an embroidery block subsequent thereto, the second mat-type stitch data preparing means is instructed to be actuated. In this case, for one or plural embroidery blocks containing a subsequent embroidery block, whose stitch advancing directions are substantially identical to one another, the second mat-type stitch data preparing means obtains the mat-type stitch needle location data for a mat-type stitch pattern continuous with the prescribed mat-type stitch pattern with its stitch advancing direction being inverted, on the basis of the embroidery stitch data received from the embroidery data preparing means.

As described above, when the stitch terminal end portion of each embroidery block is adjacent to the end portion of the subsequent embroidery block, the mat-type stitch needle location data for the prescribed mat-type stitch pattern is automatically obtained for the one or plural continuous embroidery blocks which have substantially the same stitch advancing direction. Furthermore, even when the stitch terminal end portions are adjacent to each other, the mat-type stitch needle location data for the mat-type stitch pattern continuous with the prescribed mat-type stitch pattern, whose stitch advancing direction is inverted, are automatically obtained for the one or plural continuous embroidery blocks containing the subsequent embroidery block. That is, the mat-type needle location data which are obtained in the inverted stitch advancing direction are embroidered in a further opposite order, whereby the continuous mat-type stitch pattern can be embroidered.

According to the embroidery data preparing device of the first aspect of the invention, the first mat-type stitch data preparing means and the second mat-type stitch data preparing means are provided. When the stitch terminal end portion of each embroidery block is not adjacent to the stitch terminal end portion of the subsequent embroidery block, the mat-type stitch needle location data for the prescribed mat-type stitch pattern is automatically obtained for the one or plural continuous embroidery blocks which have substantially the same stitch advancing direction. Furthermore, even when the stitch terminal end portions are adjacent to each other, the mat-type stitch needle location data for the mat-type stitch pattern continuous with the prescribed mat-type stitch pattern, whose stitch advancing direction is inverted, are automatically obtained for the one or plural continuous embroidery blocks containing the subsequent embroidery block. That is, the mat-type needle location data which are obtained in the inverted stitch advancing direction are embroidered in a further inverted order, whereby the continuous mat-type stitch pattern can be embroidered.

According to the embroidery data preparing device of the second aspect of the invention, the device is equipped with the end portion judging means for judging whether the end portion of each embroidery block is adjacent to the end portion of the subsequent embroidery block, and any one of the first mat-type stitch data preparing means and the second mat-type stitch data preparing means is selectively actuated in accordance with the judgment result of the end portion judging means. Therefore, the judgment on the adjacent state between end portions is automatically judged, Furthermore, in accordance with the judgment result, the first or second mat-type stitch data preparing means is automatically actuated, so that a continuous mat-type stitch pattern can be automatically formed without user intervention.

BRIEF DESCRIPTION OF THE DRAWINGS

A preferred embodiment of the invention will be described in detail with reference to the following figures wherein:

FIG. 14 is a diagram corresponding to FIG. 3 when the stitch start end point and the stitch terminal end point of the embroidery block data are exchanged;

DETAILED DESCRIPTION OF THE PREFERRED EMBODIMENT

A preferred embodiment according to the invention will be described hereunder with reference to the accompanying drawings. This embodiment relates to a case where the invention is applied to an embroidery data preparing device for dividing the outline of an embroidery figure into plural embroidery blocks and preparing embroidery stitch data for mat-type stitches.

Figure 1:
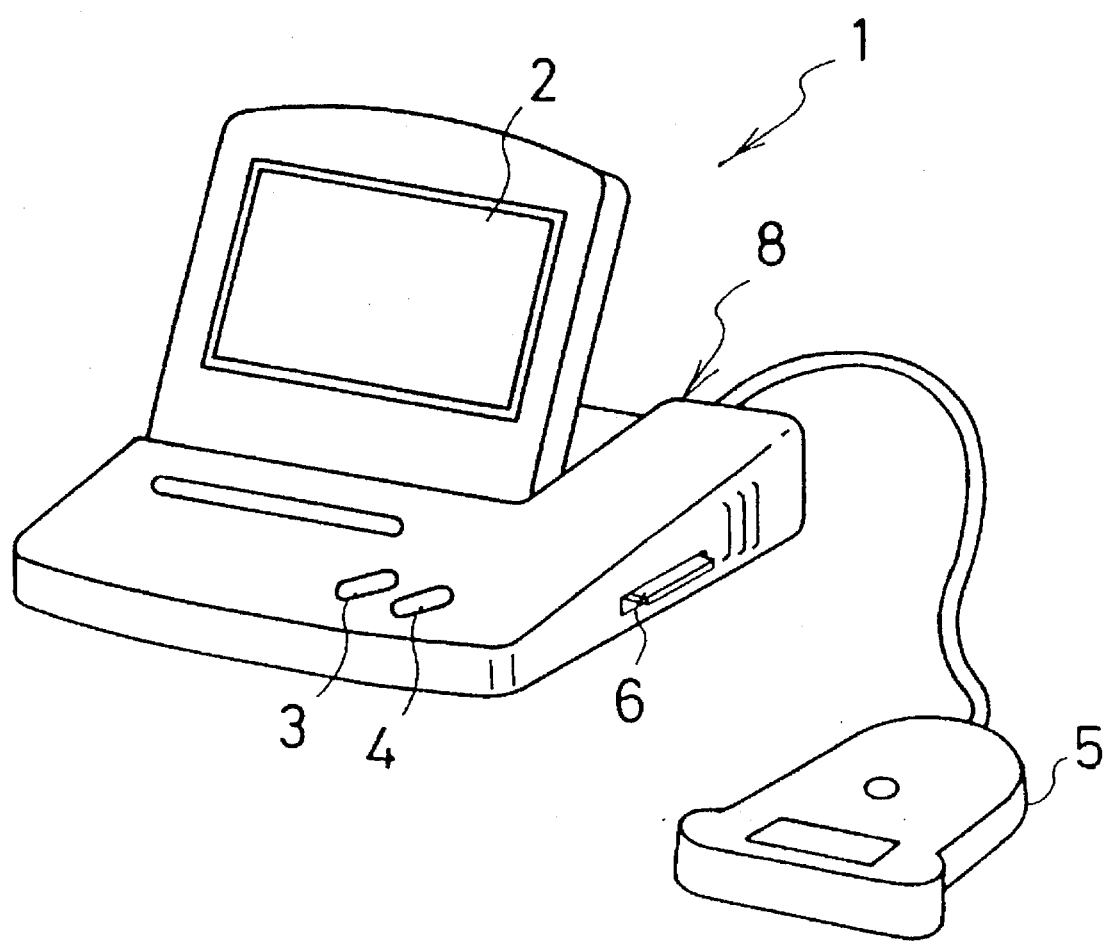
FIG. 1 is a perspective view showing an embroidery data preparing device according to the invention.

As shown in FIG. 1, the embroidery data preparing device 1 includes a liquid crystal display (LCD) 2 for displaying characters or images, operation keys 3,4 for performing a read-out operation of an embroidery figure 30 and executing image processing, an image scanner device 5 for reading out the embroidery figure 30 (FIG. 11), a flash memory device (FMD) 7 (FIG. 2) in which a memory card 6 comprising a non-volatile flash memory is detachably mounted, and a control body portion 8 which is connected to the above elements. An input port 14 and an output port 15 (FIG. 2) are further provided in the rear of the control body portion 8.

Figure 2:
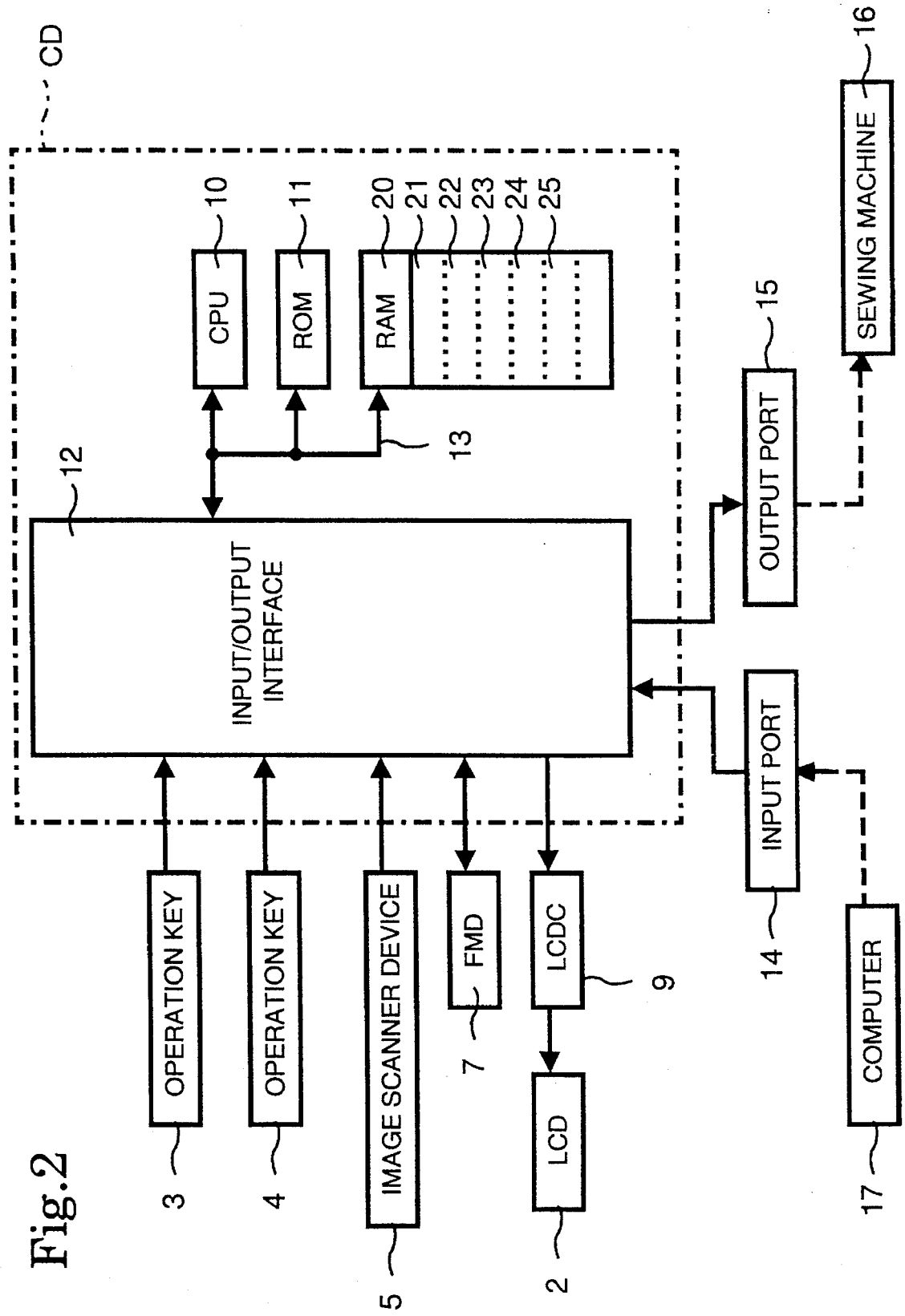
FIG. 2 is a block diagram showing a control system for the embroidery data preparing device.

The input port 14 can be connected to a computer 17. The embroidery data preparing device 1 can read in original picture data of bit image which is prepared by the personal computer through the input port 14. The output port 15 can be connected to a sewing machine 16 (FIG. 2). Embroidery stitch data which are prepared by the embroidery data preparing device 1 are transmitted to the sewing machine connected to the output port 15. The sewing machine performs an embroidering operation on the basis of the embroidery stitch data.

The control system for the embroidery data preparing device 1 is structured as shown in FIG. 2. The control body portion 8 contains a control device CD therein. An input/output interface 12 of the control device CD is connected to the two operation keys 3,4, the image scanner device 5, the flash memory device 7, a display controller (LCDC) 9 having a video RAM for outputting display data to the liquid crystal display 2, the input port 14 and the output port 15.

The control device CD includes a CPU 10, the input/output interface 12 which is connected to the CPU through a bus line 13, such as a data bus and an address bus, a ROM 11 and a RAM 20.

The ROM 11 contains, at least, a display driving control program for controlling the display controller 9 on the basis of the read-out figure image data and a control program for controlling data preparation of embroidery stitch data for mat-type stitches, which is inherent to the invention and will be described in detail later.

Figure 13:
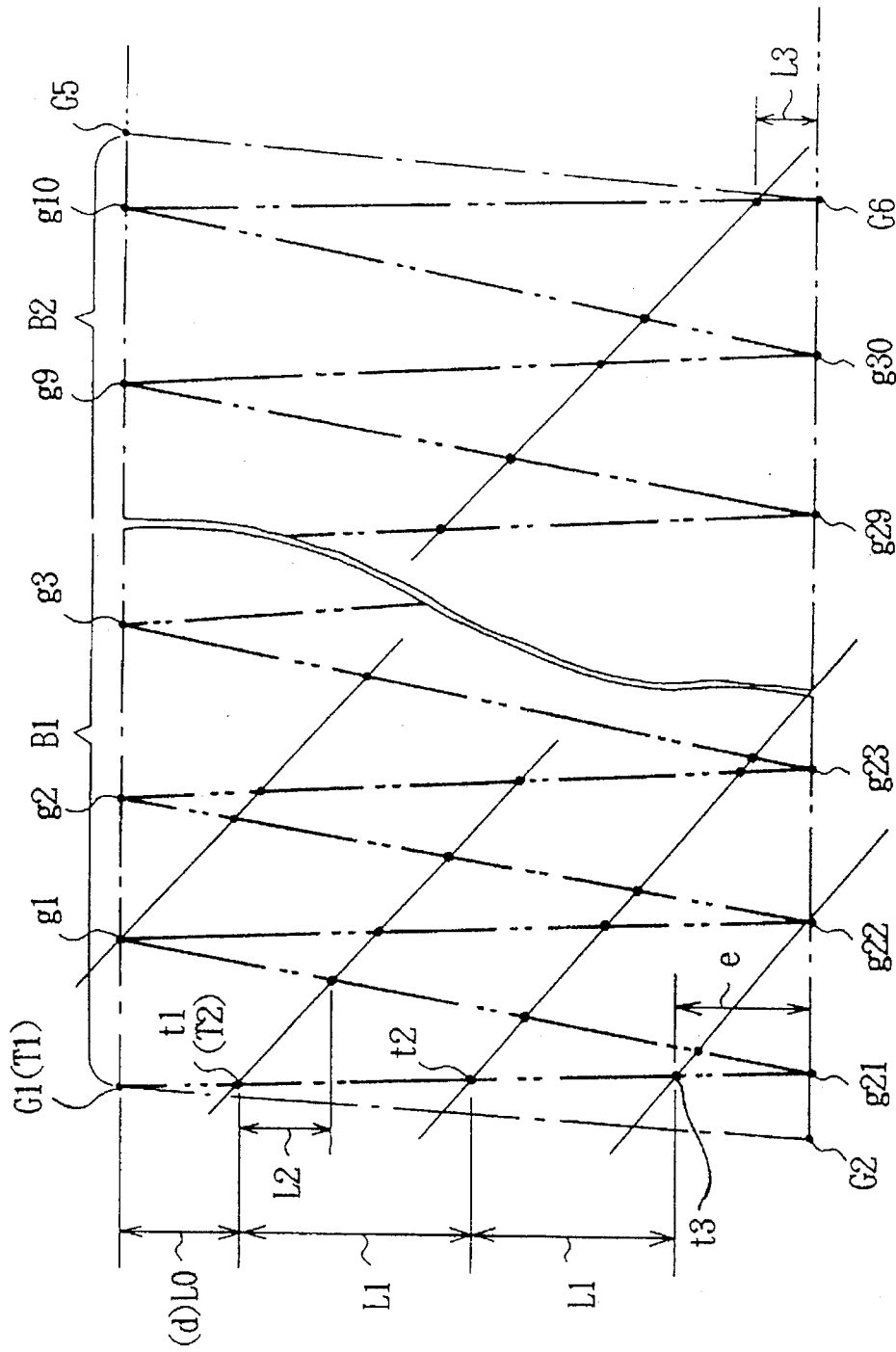
FIG. 13 is a diagram showing a mat-type stitch pitch used for mat-type stitches.

The RAM 20 is provided with various memories such as an embroidery block data memory 21 for storing data of embroidery blocks obtained by dividing the embroidery figure into a plurality of areas; an embroidery stitch data memory 22 for storing embroidery stitch data which are obtained for each embroidery block; a stitch-end information memory 23 for storing each stitch-end information number and information on stitch terminal end portions of a series of embroidery blocks which have substantially the same stitch advancing direction; a mat-type stitch pitch memory 24 for storing a mat-type stitch starting pitch L0, a mat-type pitch L1, a mat-type stitch displacement width L2, and a mat-type stitch terminating pitch L3; a work memory 25 for temporarily storing various data in the course of an operation, a memory for temporarily storing operation results which are obtained by the CPU 10. The four mat-type stitch pitches L0 to L3 are as shown in FIG. 13.

Figure 5:
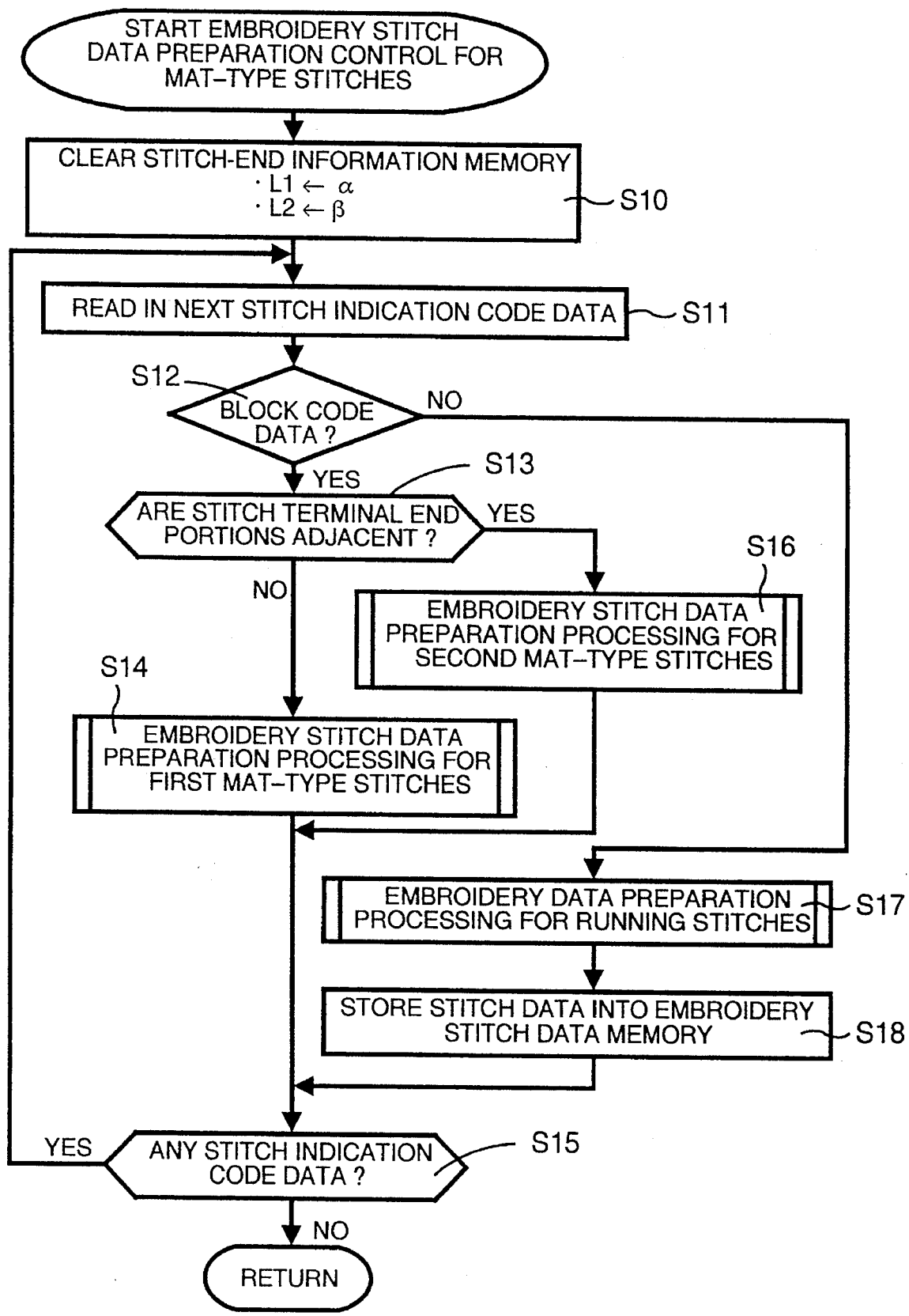
FIG. 5 is a flowchart for an embroidery stitch data preparing control routine for mat-type stitches.

Next, an embroidery stitch data preparation control routine for mat-type stitches, which is executed in the control device CD of the embroidery data preparing device 1, will be described with reference to the flowchart of FIG. 5. In FIG. 5, reference characters Si (i=10, 11, 12, ...) represent each step.

Figure 3:
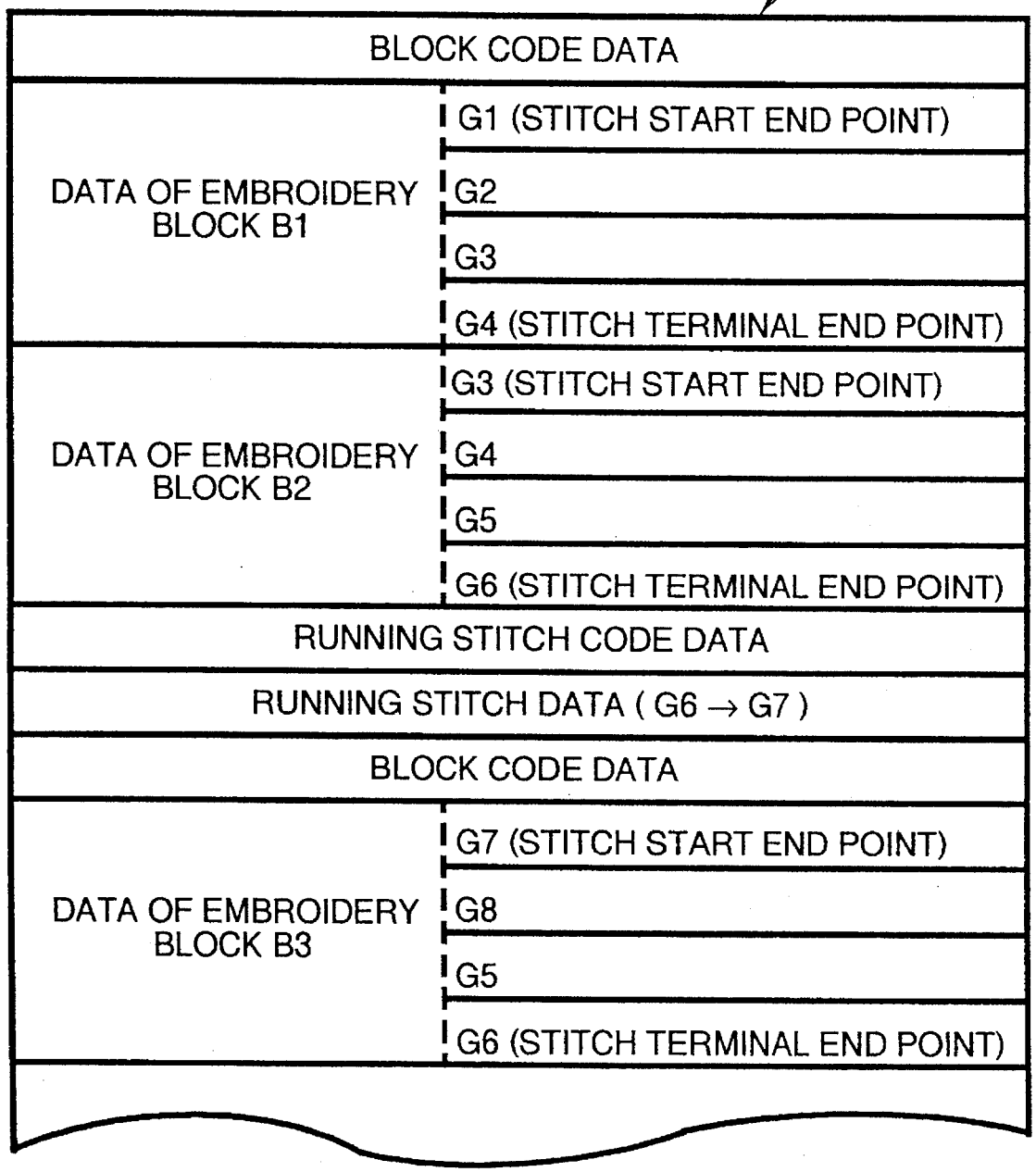
FIG. 3 is a diagram showing a data format of an embroidery block data memory.
Figure 4:
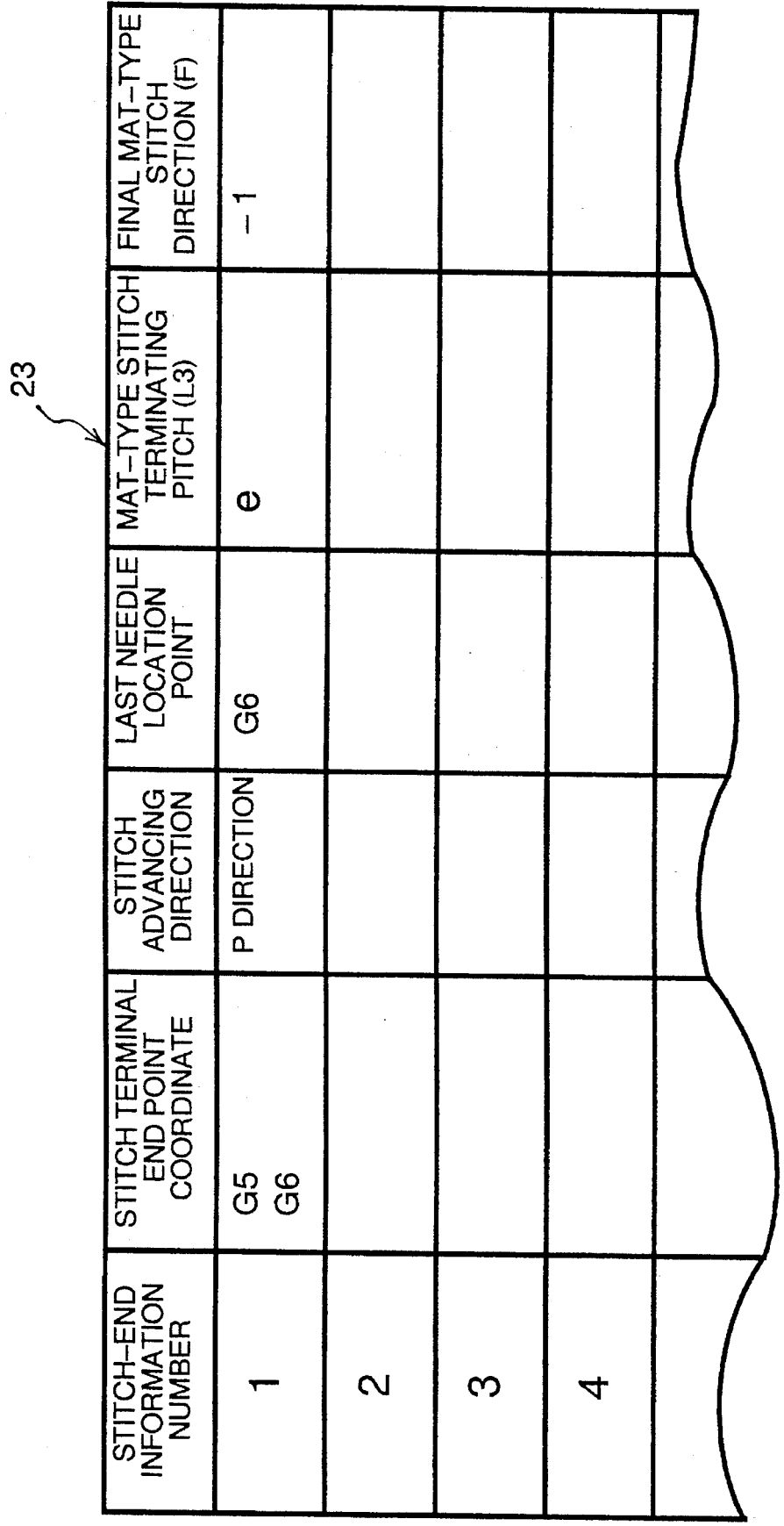
FIG. 4 is a diagram showing a data format of a stitch-end information memory.
Figure 11:
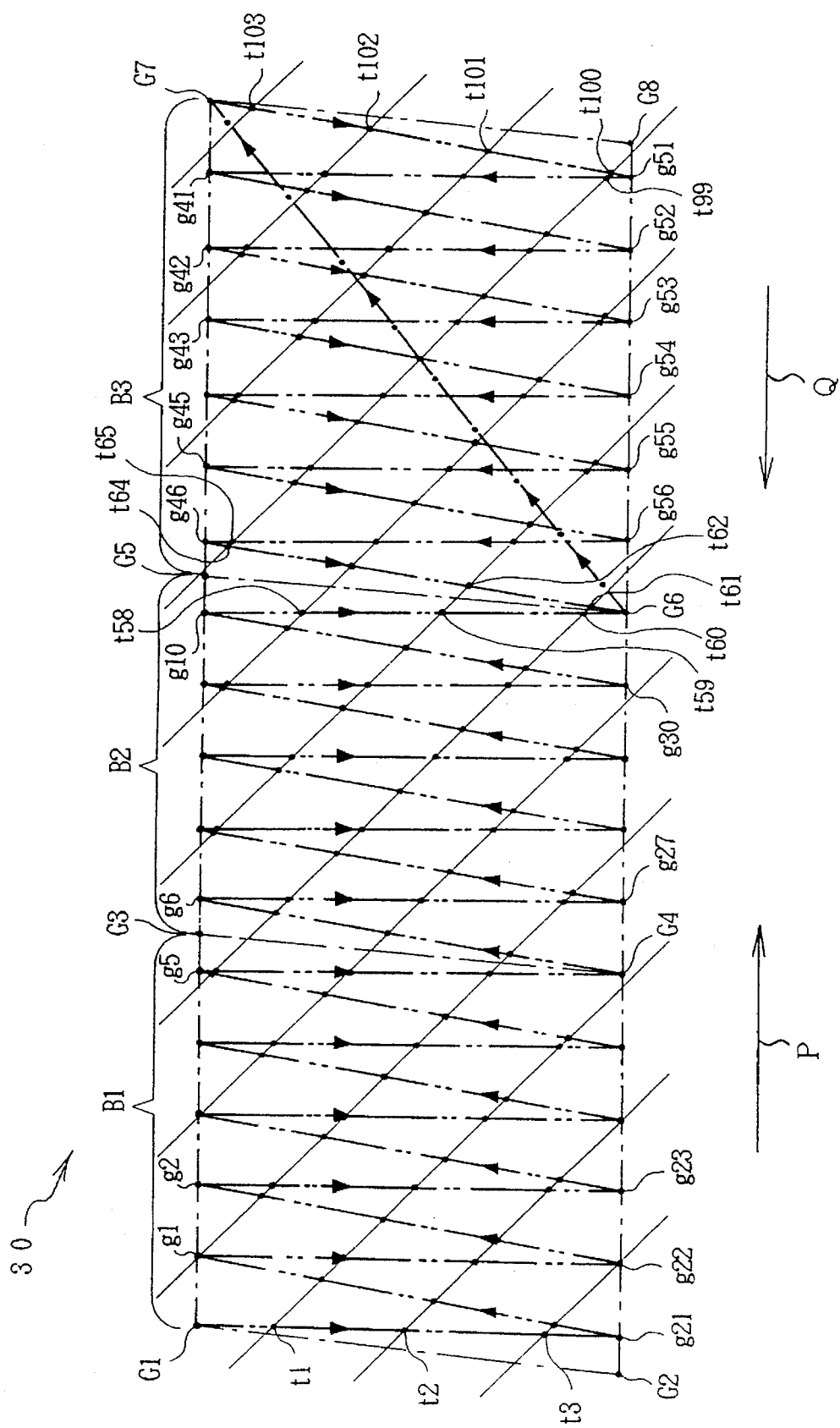
FIG. 11 is a diagram showing embroidery stitch data when the stitch terminal end portions of two embroidery blocks and one embroidery block are adjacent to one another.

In this embodiment, the embroidery figure 30 has a rectangular shape as shown in FIG. 11. The embroidery figure 30 is divided into three embroidery blocks B1 to B3. As shown in FIG. 3, respective data are stored in the embroidery block data memory 21 as follows as a pre-stage before the control is started.

For each of the embroidery blocks B1 to B3, in the embroidery block data memory 21 are stored block code data, data for the embroidery block B1 comprising four definition end points G1 to G4, data for the embroidery block B2 comprising four definition end points G3 to G6, running stitch code data from a definition end point G6 toward a definition end point G7, block code data, and data for the embroidery block B3 comprising four definition end points G7, G8, G5 and G6. Here, each block code datum corresponds to a stitch indication code datum representing that the next data are data for an embroidery block. Each running stitch code datum corresponds to a stitch indication code datum representing that the next data are data for running stitches.

Upon manipulation of the operation key 3, the control routine of FIG. 5 is started. First, the stitch-end information memory 23 is cleared. At the same time, a constant $\alpha$ is set to the mat-type stitch pitch L1 and a constant $\beta$ is set to a mat-type stitch displacement width L2 (S10). A first stitch instruction code datum is read out on the basis of the data of the embroidery block data memory 21 (S11). When the stitch instruction code data are the block code data (S12: Yes), it is determined, on the basis of the data of the embroidery block data memory 21 and the data of the stitch-end information memory 23 whether the stitch terminal end portion of an embroidery block subsequent to the block code data is adjacent to the stitch terminal end portion of a series of embroidery blocks for which embroidery stitch data have been already prepared (S13). At this time, one or a plurality of continuous embroidery blocks, which are subsequent to the block code data and have substantially the same stitch advancing direction, are treated as one embroidery block.

If the stitch terminal end portions of the embroidery blocks are not adjacent to each other in S13, that is, if two stitch terminal end point coordinates of a embroidery block for which embroidery stitch data are prepared at this time are not coincident with two stitch terminal end point coordinates of a series of embroidery blocks for which embroidery stitch data have been already prepared (S13: No), the embroidery stitch data preparation processing control (see FIG. 6) for first mat-type stitches is executed (S14).

Figure 6:
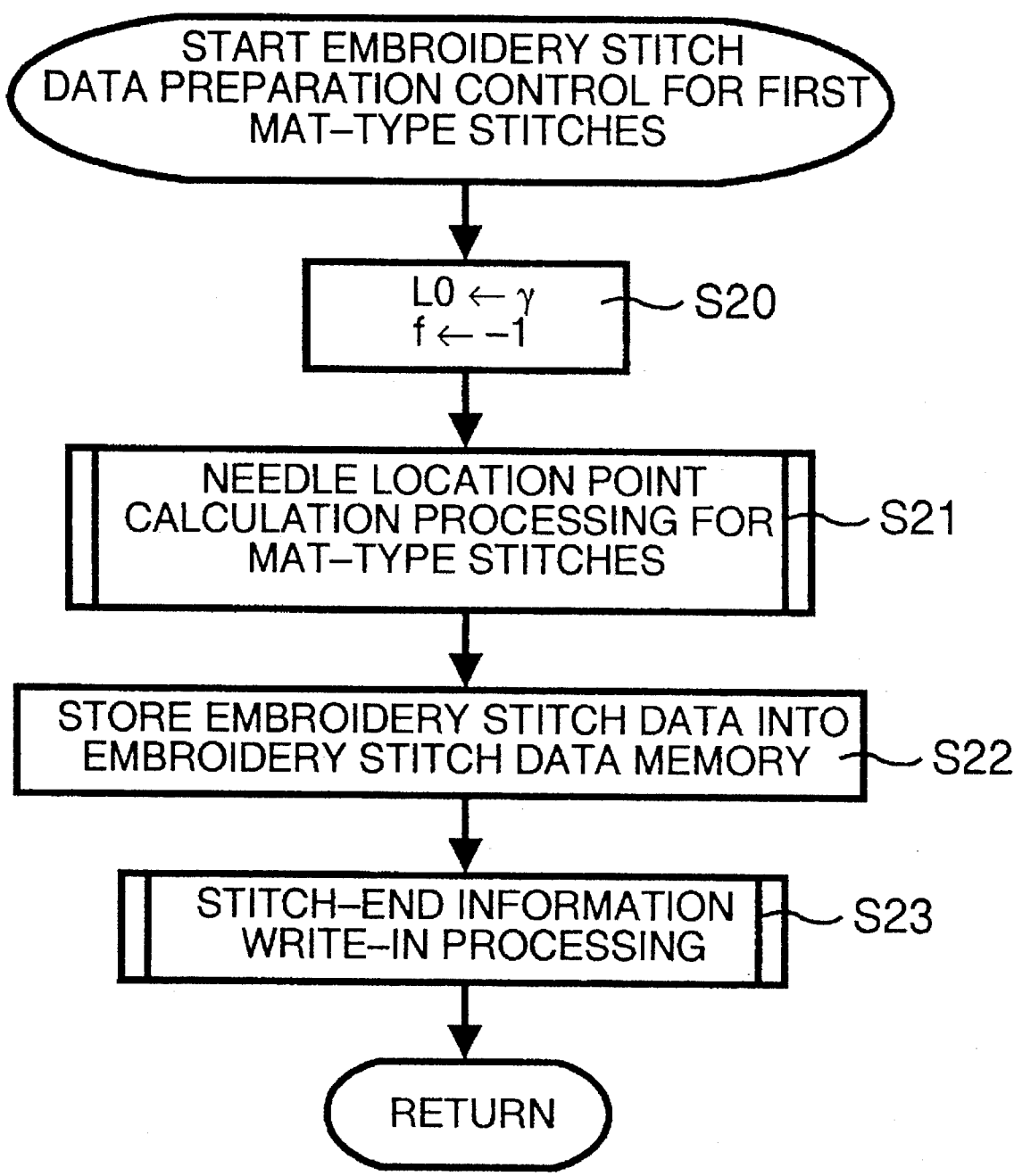
FIG. 6 is a flowchart for an embroidery stitch data preparation processing control routine for first mat-type stitches.

Upon start of the embroidery stitch data preparation processing control for the first mat-type stitches of FIG. 6, an initial value "γ" is first set to the mat-type stitch starting pitch L0, and a mark representing a stitching direction is set to a stitch direction variable f. The stitch direction mark is equal to "−1" when it intersects to the stitch advancing direction from the left to the right, and to "+1" when it intersects to the stitch advancing direction from the right to the left. A vector [H1H2] (FIG. 12), that is, a vector which directs from the end point G1 toward the end point g21 intersects to the stitch advancing direction P from the left to the right, so that "−1" is set to the stitching direction variable f (S20). Thereafter, the mat-type stitch needle location point calculation processing control is executed (see FIG. 7).

Upon start of the control, a divisional point calculation processing to perform an embroidering operation in a V-stitch mode is executed for a series of embroidery blocks which are to be currently embroidered (S25). Divisional points obtained through this processing are set as end points g and the plurality of end points g and the definition end points G are arranged in a stitching order and then stored in the work memory 25 (S26).

Figure 12:
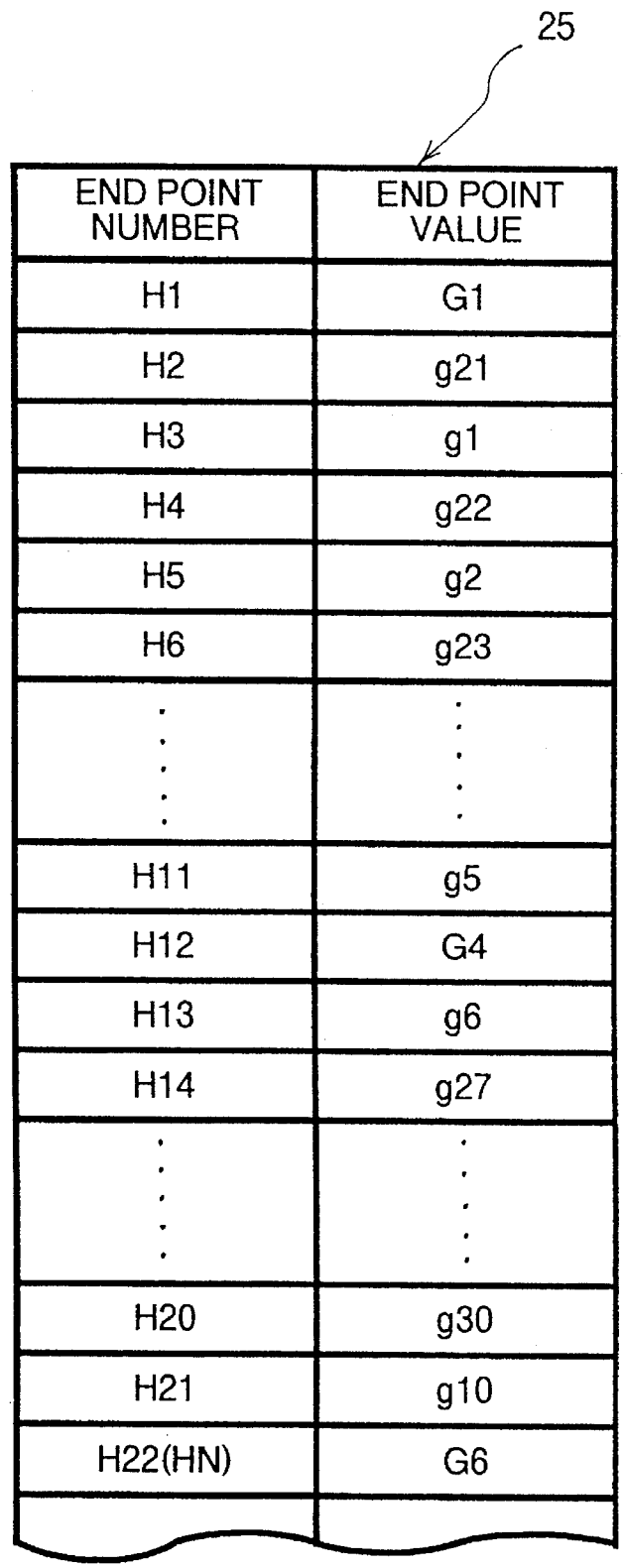
FIG. 12 is a diagram showing end point numbers which are allocated to respective end point values.

For example, as shown in FIG. 11, a line segment G1–G5 of the two embroidery blocks B1,B2 is continuously embroidered. That is, the line segment at the upper side of FIG. 11 is equi-sectioned on the basis of the density of thread to obtain plural end points g1, g2, g3, ... , g10. In addition, the line segment G2–G6, that is, the line segment at the lower side of FIG. 11 is equi-sectioned on the basis of the thread density to obtain plural end points g21, g22, g23, ... , g30. Further, the stitch start point G1, g21, g1, g22, g2, g23, ... , g5, G4, g6, ... , to the stitch terminal end point G6 are stored as end point values H corresponding to end point numbers H1 to H22 (FIG. 12).

Subsequently, an initial value "1" is set to the end point number variable n, and the starting pitch variable d is initially set equal to a current mat-type stitch starting pitch L0 (S27). Thereafter, a calculation processing control for a series of mat-type stitch needle location points (see FIG. 8) is executed (S28).

Figure 8:
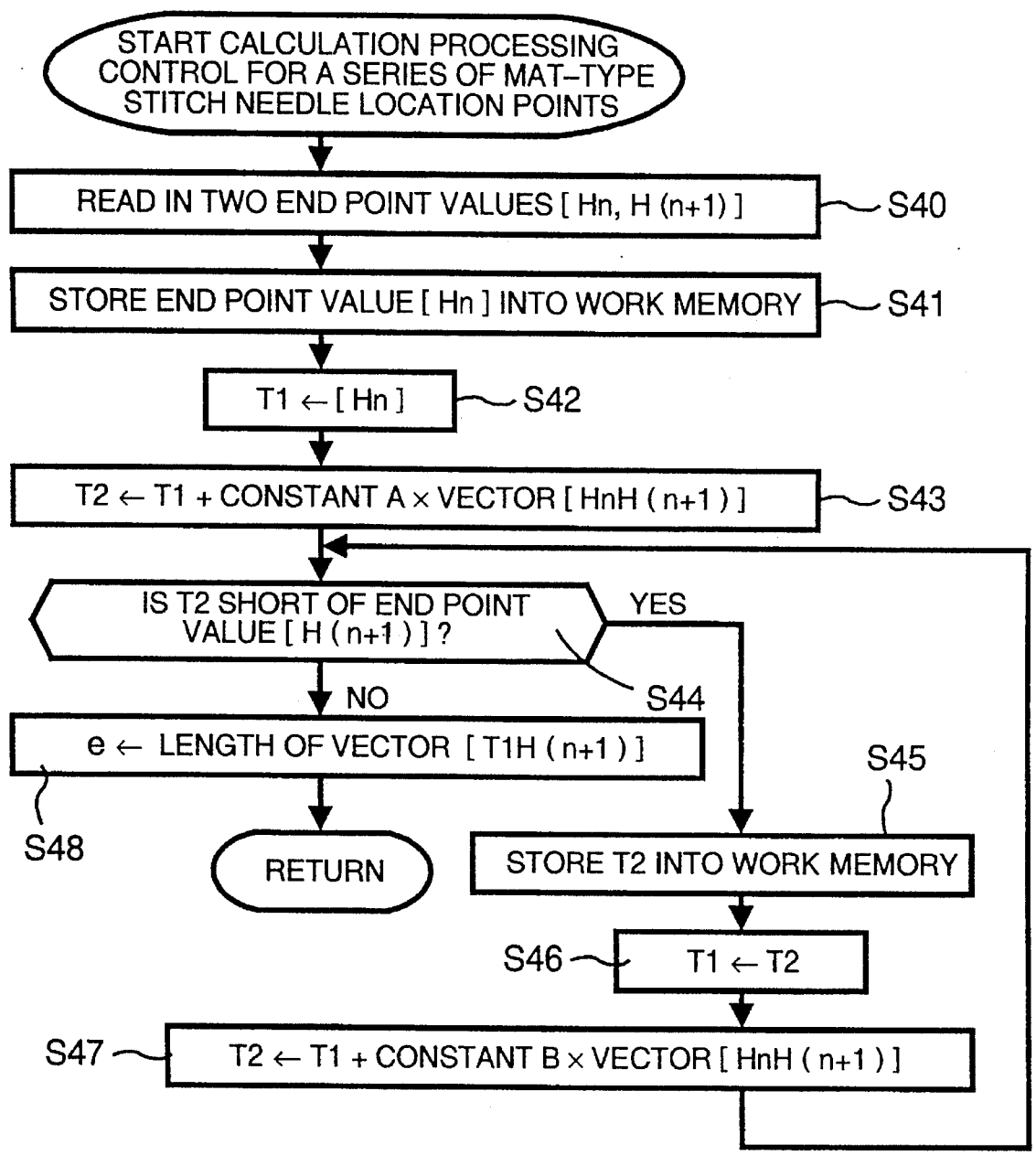
FIG. 8 is a flowchart for a routine of a series of mat-type stitch needle point calculation processing control.

Upon start of the mat-type stitch needle location point calculation processing control of FIG. 8, two end point values Hn and H(n+1) are first read in (S40). The end point value Hn is stored as embroidery stitch data (needle location point data) into the work memory 25 (S41).

Subsequently, the end point value Hn is set as a needle location point T1 for the mat-type stitches (S42). Furthermore, as a next needle location point T2 is set a value which is obtained by multiplying a vector directing from the end point value Hn to the end point value H(n+1) with a constant A and then adding the multiplied result with T1 (S43). The constant A represents the length of d/vector[HnH(n+1)]. For example, when the end point number variable n is equal to "1", the needle location point T2 represents a position vector at T2 in the course of the vector which directs from the end point value H1, that is, the end point G1 to the end point value H2, that is, the end point g21.

Subsequently, if the calculated needle location point T2 is located short of the end point value [H(n+1)] on the vector [HnH(n+1)] (S44: Yes), the needle location point T2 is stored as a needle location point t for mat-type stitches (embroidery stitch data) into the work memory 25 (S45), and the value of the needle location point T2 is reset to be the needle location point T1 (S46) for further processing. The new needle location point T2 is set at a value which is obtained by multiplying the vector directing the end point value Hn to the end point value H(n+1) with a constant B and then adding the multiplied result with T1 (old T2 as reset) (S47), and the process returns to step S44. Here, the constant B equals L1/vector[HnH(n+1)]. The steps S44 to S47 are repeated. For example, t1 (S42, S43), and t2, t3 (S44–S47) are calculated as a needle location points t for mat-type stitches (embroidery stitch data) respectively, and stored in the work memory 25 as shown in FIG. 13.

If the next developed needle location point T2 is beyond the end point value [H(n+1)] on the vector [HnH(n+1)] (S44: No), the length of the vector [T1H(n+1)] is set as a return pitch e for a return at an end point. For example, the return pitch e which corresponds to the length from the last needle location point T1 on the vector G1g21, that is, "t3" until the end point g21 is calculated as shown in FIG. 13. Thereafter, the control routine is ended, and then process returns to step S29 for the needle location point calculation processing control of FIG. 7.

Figure 7:
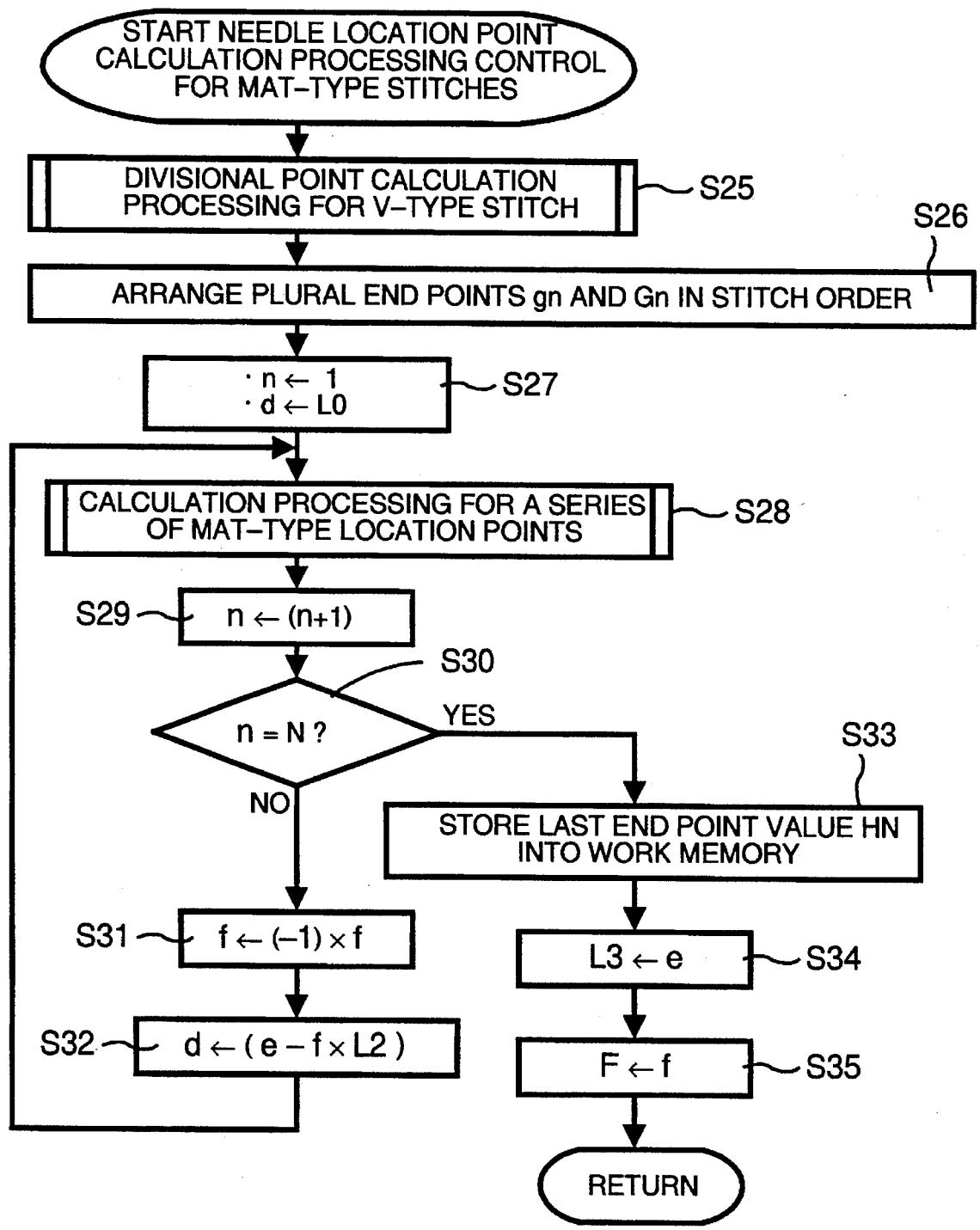
FIG. 7 is a flowchart for a needle location calculation processing control routine for mat-type stitches.

Subsequently, in the needle location point calculation processing control of FIG. 7, the end point number variable n is incremented by "1" (S29). If the end point number variable n does not reach the end point maximum number N (S30: No), the stitch direction variable f is renewed by multiplying with "−1" (S31). This operation is used to invert the stitch direction. Furthermore, a new starting pitch variable d is calculated according to a calculation equation (e−f×L2) (S32). Thereafter, the process returns to the step S28, and the steps S28 to S32 are repeated.

If the end point number variable n reaches the end point maximum number N through the repetitive execution of the steps S28 to S32 (S30: Yes), the last end point value HN, that is, the end point G6 is stored in the work memory 25 (S33). Further, the value of the return pitch e obtained in step S48 is set as the mat-type stitch terminating pitch L3 (S34), and the value of the stitch direction variable f is set as the final mat-type stitch direction F (S35). Thereafter, the control routine is terminated and the process returns to step S22 of the embroidery stitch data preparation processing control.

Subsequently, in the embroidery stitch data preparation processing control of FIG. 6, the embroidery stitch data (needle location point) stored in the work memory 25 are stored in the embroidery stitch data memory 22 (S22). Thereafter, a stitch end information write-in processing is executed (S23). In the stitch-end information write-in processing, stitch-end information is written in the stitch-end information memory 23. The stitch-end information is first written as stitch-end information number "1", and subsequently as stitch end-information numbers "2", "3", ... into the stitch-end information memory 23. Specifically, "coordinate values of G5 and G6" are written as coordinates of two stitch-end points, "P direction" is written as the stitch advancing direction, "end point G6" is written as the last needle location point, and the value of the return pitch e is written as the mat-type stitch terminating pitch L3. Furthermore, the value of the stitch direction variable f is written as the final mat-type stitch direction F. In this embodiment, "F=−1". After the processing of the step S23, the embroidery stitch data preparation processing control is terminated, and the process returns to step S15 of the embroidery stitch data preparation control routine of FIG. 5.

In the embroidery stitch data preparation control of FIG. 5, if next stitch indication code data exist in the embroidery block data memory 21 (S15: Yes), the process returns to the step S11. If the next stitch indication code data are running stitch code data (S12: No), embroidery stitch data (needle location points) including plural needle location points which are obtained every predetermined pitch are prepared for the running stitches (S17). The embroidery stitch data of the running stitches are additionally stored in the embroidery stitch data memory 21 (S18), and the process returns through step S15 to step S11.

If the next indication code data thus read in are block code data (S12: Yes) and the stitch terminal ends of the embroidery blocks are adjacent to each other (S13: Yes), an embroidery stitch data preparation processing control for second mat-type stitches (see FIG. 9) is executed (S16).

Figure 9:
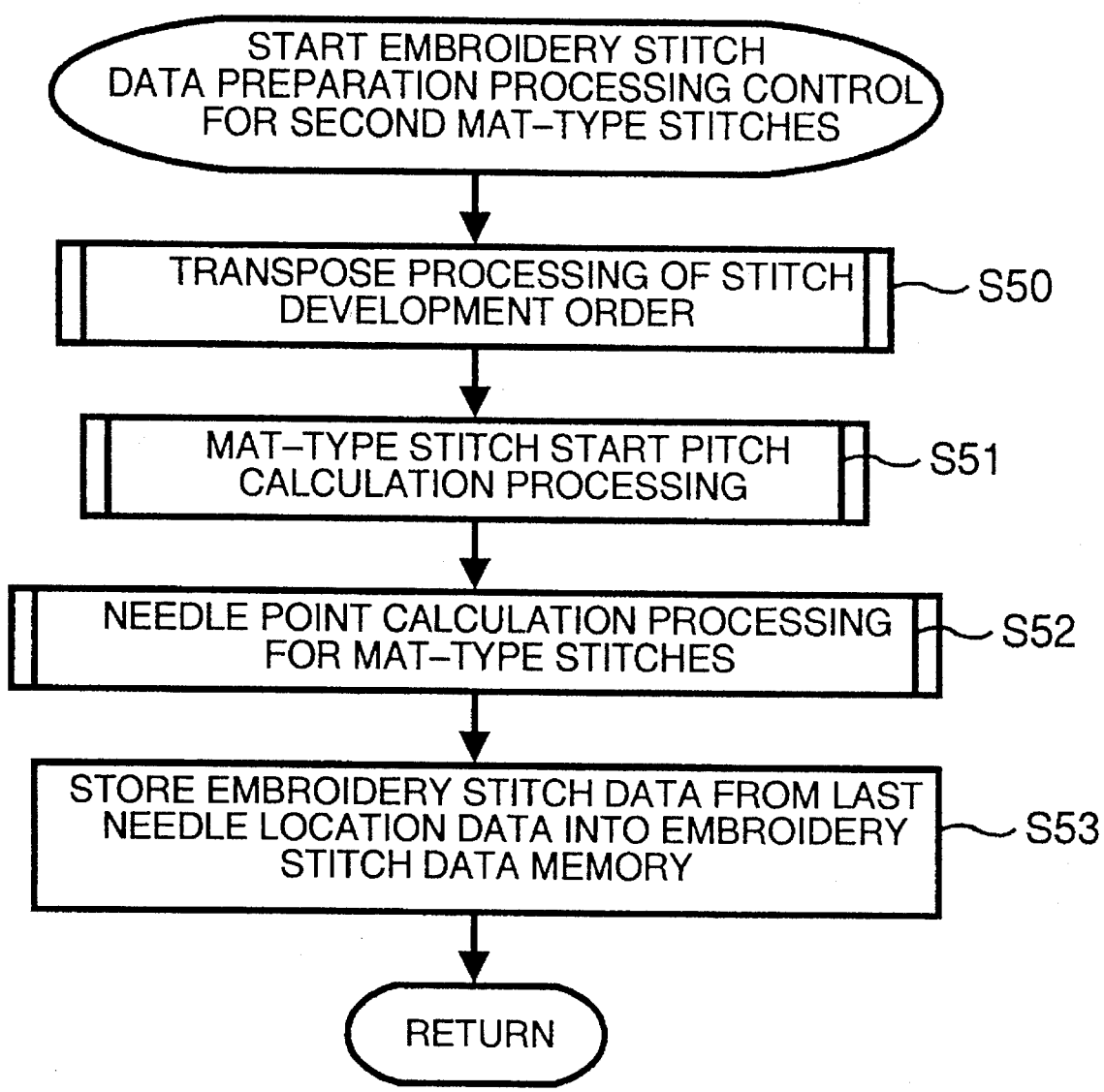
FIG. 9 is a flowchart for an embroidery stitch data preparation processing control routine for second mat-type stitches.

Upon start of the control routine of FIG. 9, a stitch development order transposing processing is first executed (S50). This transpose processing corresponds to an operation of inverting the stitch advancing directions P and Q. With respect to the embroidery block B3 which is subsequently read in, the coordinates of the stitch terminal end points "G5 and G6" of the embroidery block B3 are common to the coordinates of the stitch terminal end points "FG5 and G6" which are stored at the stitch-end information number "1". That is, since the stitch terminal end portions of the embroidery block B3 are adjacent to (in fact are the same as) the stitch terminal end portions of the embroidery blocks B1,B2 for which the embroidery stitch data have already been prepared, the embroidery block data of the embroidery block B3 are transposed as shown in FIG. 14 (G6 (stitch start end point), G5, GS, G7 (stitch terminal end point)). The transposing processing of the stitch development order is performed as described above.

Thereafter, the calculation processing control (see FIG. 10) to calculate the mat-type stitch starting pitch L0 is executed (S51). Upon start of this control routine, the mat-type stitch starting pitch L0 is calculated on the basis of the data of the stitch-end information memory 23 and the data of the embroidery block data memory 21 as follows.

If a previous last needle location point and a current first needle location point are located on the same main side, i.e., at either a top edge (FIG. 16) or a bottom edge (FIG. 15), (S60: Yes) and the previous final mat-type stitch direction F is "−1" (S61: Yes), the mat-type starting pitch L0 is calculated according to (L3−L2)%L1, and "+1" is set to the stitch direction variable f (S62). Here, the symbol "%" represents the symbol of an operation of calculating a remainder. For example, when a previous last needle location point and a current first needle location point are located at the same main side at the lower side (FIG. 15) and the final mat-type stitch direction F is "−1", the mat-type stitch starting pitch L0 to calculate a first mat-type stitch needle point t61 subsequent to the stitch start end point G6 of the embroidery block B3, which is required to keep a current mat-type stitch pattern continuous with a previous prescribed mat-type pattern, can be calculated according to the above calculation because the direction of a vector g10G6 and the direction of a vector G6g46 are substantially opposite to each other through the end point G6.

If the previous last needle location point and the current first needle location point are located at the same main side (S60: Yes) (FIG. 16) and the previous final mat-type stitch direction F is "+1" (S61: No), the mat-type starting pitch L0 is calculated according to (L3+L2)%L1, and "−1" is set to the stitch direction variable f (S63). For example when the previous last needle location point and the current first needle location point are located at the same main side at the upper side and the previous final mat-type stitch direction F is "+1", the mat-type stitch starting pitch L0 to calculate a first mat-type stitch needle point t subsequent to the stitch start end point G6 which is required to keep a current mat-type stitch pattern continuous with a previous prescribed mat-type pattern, can be calculated according to the above calculation equation.

Figure 17:
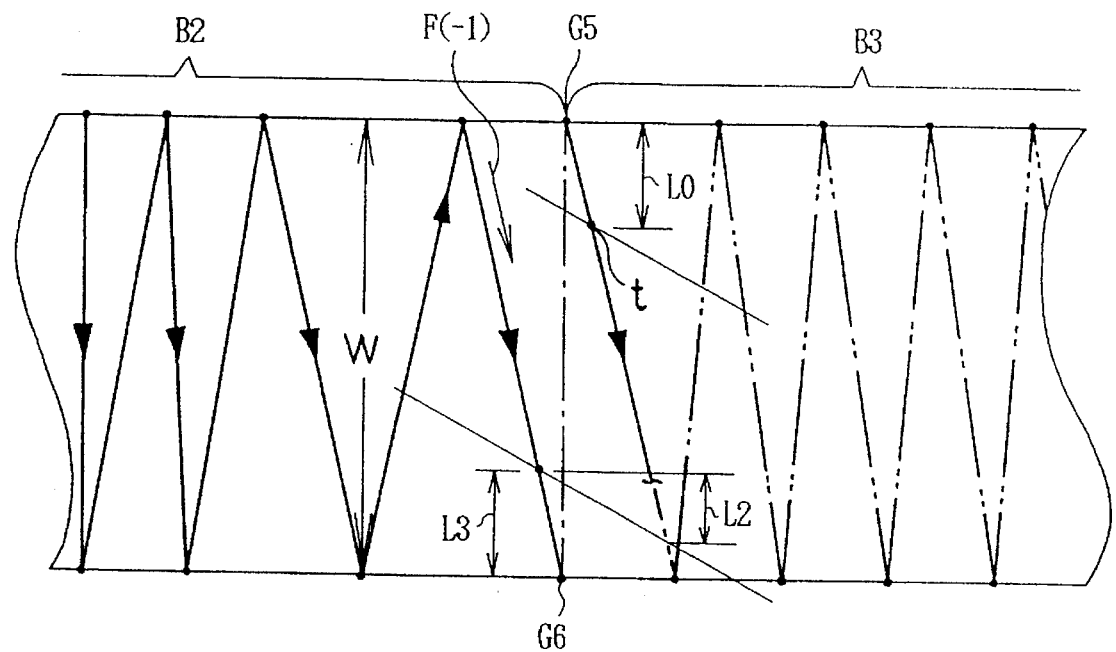
FIG. 17 is a diagram corresponding to FIG. 15 when the last needle location points are different from one another.

On the other hand, if the previous last needle location point and the current first needle location point are not located at the same main side (S60: No) (FIG. 17) and the previous final mat-type stitch direction F is "−1" (S64: Yes), the mat-type stitch starting pitch L0 is calculated according to (W−L3+L2)%L1, and "−1" is set to the stitch direction variable f (S65). "W" represents the length between the end points G5 and G6. For example when the previous last needle location point is located on the main side at the lower side and the current first needle location point is located on the main side at the upper side, that is, the stitch start end point is G5, the mat-type stitch starting pitch L0 to calculate a first mat-type stitch needle location point t subsequent to the stitch start end point G5, which is required to keep a current mat-type stitch pattern continuous with a previous prescribed mat-type stitch pattern, can be calculated according to the above calculation equation.

Figure 18:
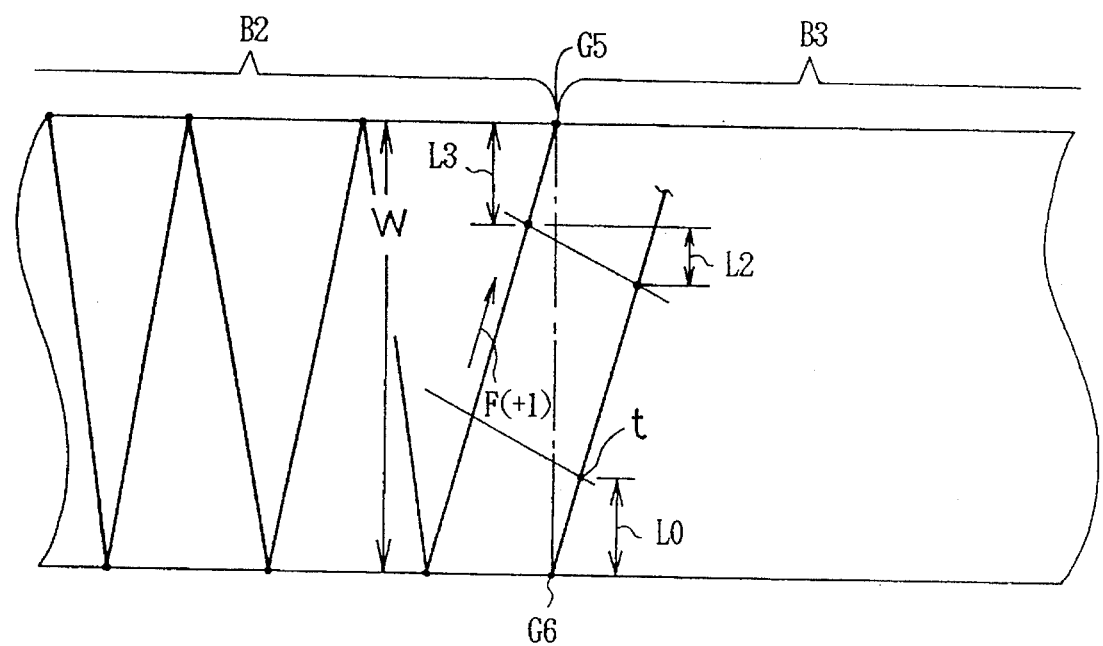
FIG. 18 is a diagram corresponding to FIG. 17 when the last needle location points are different from one another.
Figure 19:
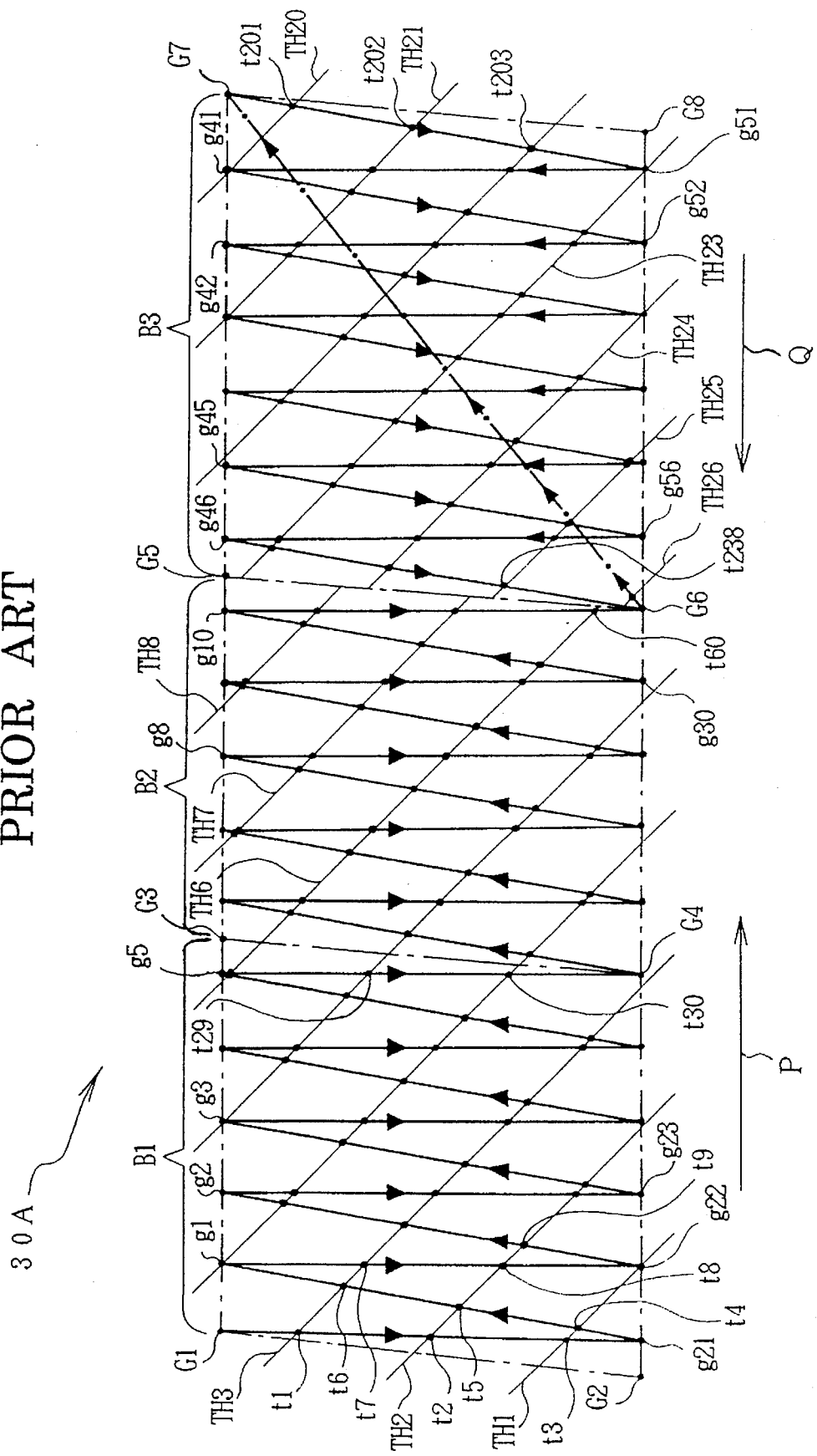
FIG. 19 is a diagram of the related art.

Further, when the previous last needle location point and the current first needle location point are not located at the same main side (S60: No) (FIG. 18) and the previous final mat-type stitch direction F is "+1" (S64: No), the mat-type stitch starting pitch L0 is calculated according to (W−L3−L2)%L1, and "+1" is set to the stitch direction variable f (S66). For example, when the previous last needle location point is located on the main side at the upper side and the current first needle location point is located on the main side at the lower side, that is, the stitch start end point is G6, the mat-type stitch starting pitch L0 to calculate a first mat-type stitch needle location point t subsequent to the stitch start end point G5, which is required to keep a current mat-type stitch pattern continuous with a previous prescribed mat-type stitch pattern, can be calculated according to the above calculation equation.

Figure 10:
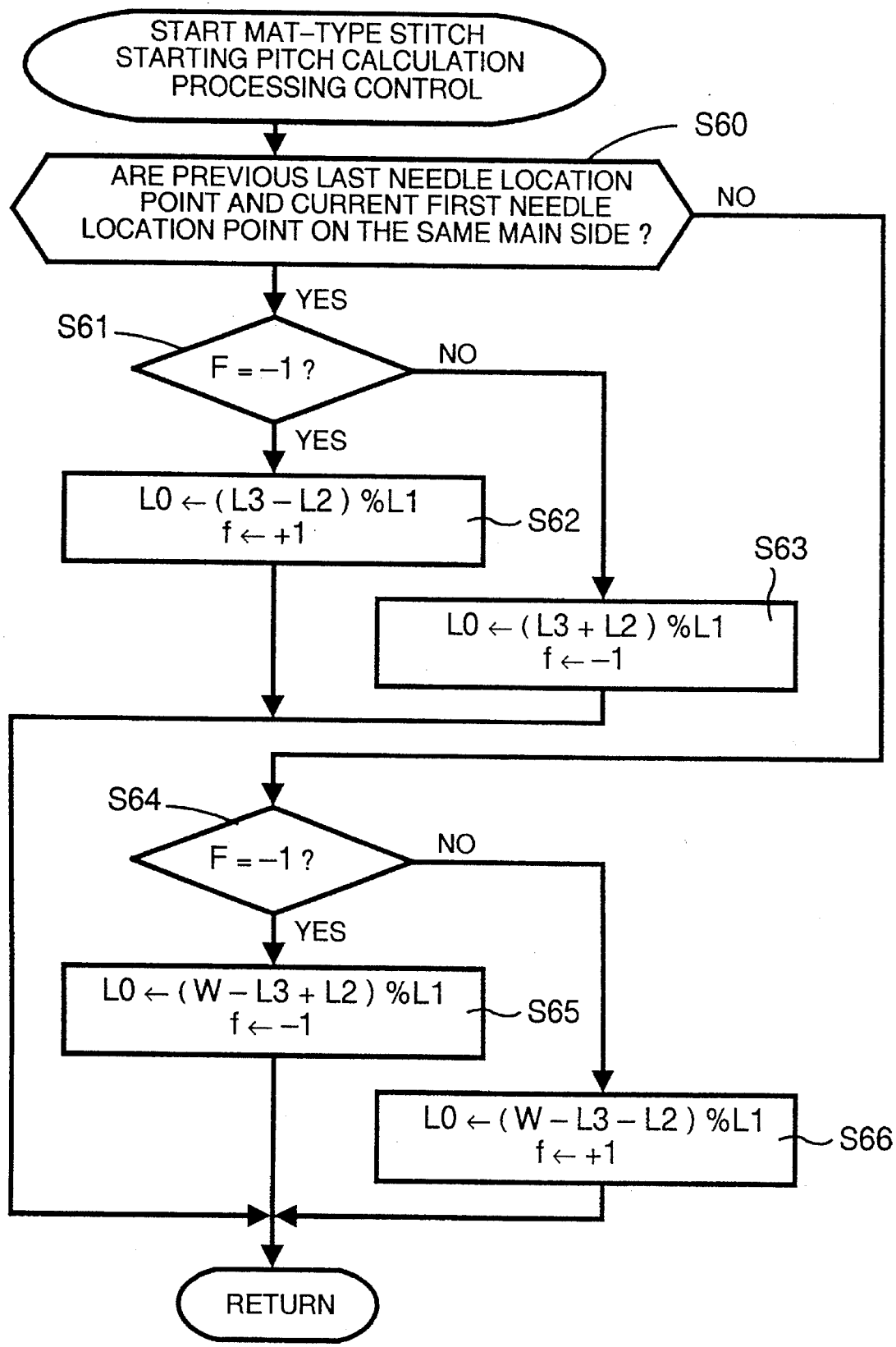
FIG. 10 is a flowchart for a mat-type stitch start pitch calculation processing control routine.

After the mat-type stitch starting pitch L0 is calculated through the processing of the steps S60 to S66, the control routine of FIG. 10 is ended, and the process returns to step S52 of the embroidery stitch data preparation processing control of FIG. 9. Of the FIGS. 15 to 18, FIG. 15, in which the stitch terminal end point is G6, corresponds to this embodiment.

Subsequently, in the embroidery stitch data preparation processing control routine of FIG. 9, the needle location point calculation processing for the mat-type stitches as described above in FIG. 7 is executed using the calculated mat-type stitch starting pitch L0 (S52). Needle location points (embroidery stitch data) for a series of current embroidery blocks are calculated so that a current mat-type pattern is continuous with a previous mat-type stitch pattern, and then stored into the work memory 25. The embroidery stitch data (needle location points) stored in the work memory 25 are successively read out from the last embroidery stitch data (needle location point), and additionally stored into the embroidery stitch data memory 22 (S53). Thereafter, the control routine is ended, and the process returns to the step S15 of the embroidery stitch data preparation control of FIG. 5.

Figure 15:
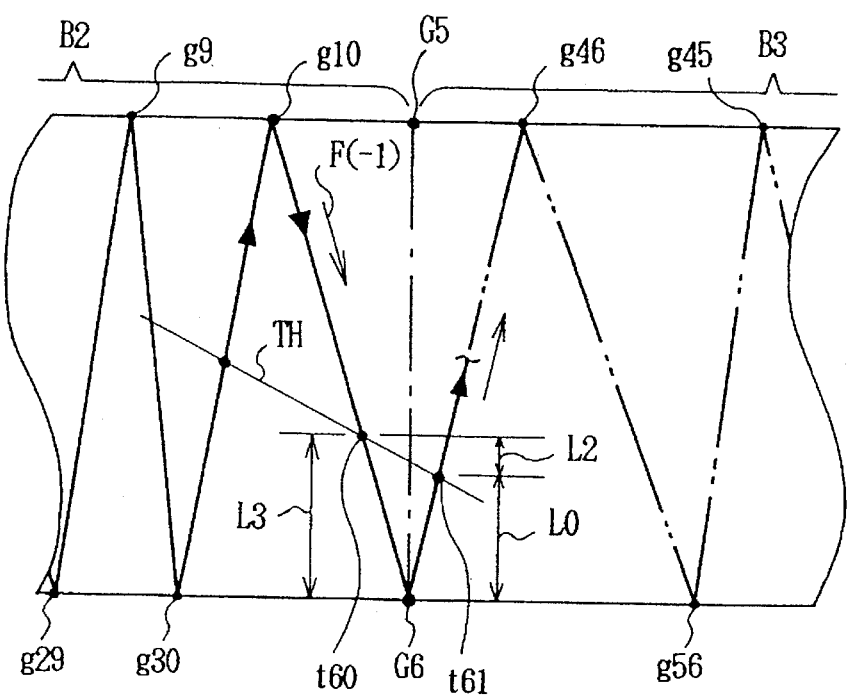
FIG. 15 is a diagram showing a calculation of a mat-type stitch start pitch when the last needle location points are coincident with one another on a main side at a lower side.
Figure 16:
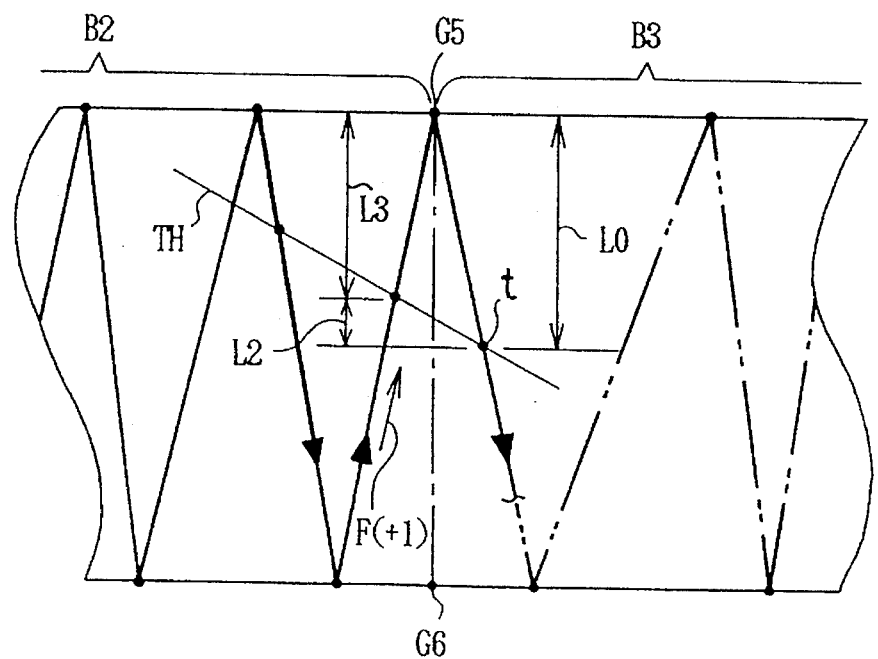
FIG. 16 is a diagram corresponding to FIG. 15 when the last needle location points are coincident with one another on a main side at an upper side.

For example, as shown in FIGS. 11 and 15, the first mat-type stitch needle location point t61 which is subsequent to the stitch start end point G6 of the embroidery block B3 is calculated on the basis of the mat-type stitch starting pitch L0 which is calculated so that the current mat-type stitch pattern is continuous with the previous prescribed mat-type stitch pattern. Thereafter, through the similar control as described above, the mat-type stitch needle location points (embroidery stitch data) for mat-type stitches are successively obtained from the stitch start end point G6 through t61, t62, t63, t64, g46, . . . , t99, g51, t100, t101, t102, t103 until the stitch terminal end point G7, and these data are stored in the work memory 25. The embroidery stitch data (needle location points) stored in the work memory 25 are those data which have the opposite stitch advancing direction to the original stitch advancing direction Q. Therefore, in order to set the stitch advancing direction of the embroidery stitch data (needle location points) to the original stitch advancing direction Q, the embroidery stitch data are stored into the embroidery stitch data memory 22 while inverting the stitch advancing direction P. That is, in the embroidery stitch data memory 22 are successively stored the embroidery stitch data (needle location points) in the following order: G7, t103, t102, t101, t100, g51, t99, . . . , t62, t61 and G6.

As a result, when an embroidering operation is performed on the basis of the embroidery stitch data stored in the embroidery stitch data memory 22, as shown in FIG. 11, a prescribed mat-type stitch pattern is embroidered over the two embroidery blocks B1,B2, and a mat-type stitch pattern which is continuous with the above mat-type stitch pattern of the embroidery blocks B2 and B3 is embroidered on the embroidery block B3 whose stitch terminal end points are adjacent to the stitch terminal end points of the embroidery blocks B1,B2.

The invention is not limited to the embodiment as described above, and various modifications may be made on the basis of existing techniques or techniques obvious to skilled persons in the art without departing from the subject matter of the invention.

For example, when the embroidery stitch data preparation control for the mat-type stitches shown in FIG. 5 is started, it may be judged whether the stitch terminal end portion of each of the embroidery blocks B1 to B3 is adjacent to the stitch terminal end portion of a subsequent embroidery block. In this case, one of the embroidery stitch data preparation control for the first mat-type stitches and the embroidery stitch data preparation control for the second mat-type stitches is selected and executed.

Furthermore, even when the stitch start end point of the embroidery block B3 is located in a gradation form with respect to the stitch terminal end point G6 of the embroidery block B2 in FIG. 15 or the stitch start end point of the embroidery block B3 is located in a gradation form with respect to the stitch terminal point G5 of the embroidery block B2, the mat-type stitch starting pitch L0 may be calculated according to a calculation equation to which the dimension of the gradation is added.

Still furthermore, the operator may judge whether the stitch terminal end portions are adjacent to each other, and select one of the embroidery stitch data preparation control for the first mat-type stitches and the embroidery stitch data preparation control for the second mat-type stitches.

What is claimed is:

1. An embroidery data preparing device for preparing embroidery stitch data to embroider an embroidery pattern on an article, comprising:

embroidery pattern inputting means for inputting an embroidery pattern;

embroidery pattern dividing means for dividing the embroidery pattern into a plurality of neighboring areas to form embroidery block data defining embroidery blocks and designating a stitching operation being advanced every embroidery block from a stitch start side of the embroidery block toward a stitch terminal side thereof on the basis of the embroidery block data for each embroidery block;

first mat-type stitch data preparing means for preparing mat-type stitch needle location data on the basis of the embroidery block data received from said embroidery pattern dividing means to embroider a prescribed mat-type stitch pattern over one or more embroidery blocks which are continuous with one another and have substantially the same stitch advancing direction when the stitch terminal end portions of each embroidery block and an embroidery block subsequent thereto are not adjacent to each other; and second mat-type stitch data preparing means for preparing mat-type stitch needle location data to embroider a mat-type stitch pattern continuous with the prescribed mat-type stitch pattern with its stitch advancing direction inverted, on the basis of the embroidery block data received from said embroidery pattern dividing means when the stitch terminal end portions of each embroidery block and an embroidery block subsequent thereto are adjacent to each other.

2. The embroidery data device according to claim 1, wherein the mat-type stitch needle location data prepared by said second mat-type stitch data preparing means is for one or a plurality of embroidery blocks whose stitch advancing directions are substantially identical to one another.

3. The embroidery data preparing device according to claim 2, further including stitch terminal end portion judging means for judging whether the stitch terminal end portion of each embroidery block is adjacent to the stitch terminal end portion of an embroidery subsequent thereto, wherein one of said first mat-type stitch data preparing means and said second mat-type stitch data preparing means is selectively actuated in accordance with the judgment result of said stitch terminal end portion judging means.

4. The embroidery data preparing device according to claim 3, wherein said embroidery pattern inputting means comprises a scanning device.

5. The embroidery data preparing device according to claim 3, further comprising an input port wherein said embroidery pattern inputting means comprises a computer connected to the embroidery data preparing device through said input port.

6. The embroidery data preparing device according to claim 3, further comprising an output port, wherein the embroidery data preparing device may be connected to a sewing machine through said output port.

7. The embroidery data preparing device according to claim 3, further comprising storage means for storing the mat-type stitch needle location data output by said first and second mat-type stitch data preparing means.

8. An embroidery data preparing device for use with an embroidery sewing machine, wherein an embroidery pattern is divided into a plurality of adjacent blocks, the device comprising:

an input device for inputting pattern block data;

judging means for determining block groups for continuous mat-type stitching of a block group in one direction;

first mat-type stitch data preparing means for preparing stitch data for a first block group; and second mat-type stitch data preparing means for preparing stitch data for a second block group, wherein said first and second block groups are adjacent and have stitch advancing directions opposite to one another, the stitch data prepared by said first and second mat-type stitch data preparing means are continuous in appearance.

9. The embroidery data preparing device according to claim 8, wherein said judging means further determines whether stitch terminal end positions of said first and said second block groups are adjacent to one another such that said second mat-type stitch data preparing means is rendered operative.

10. The embroidery data preparing device according to claim 8, wherein said judging means determines adjacent blocks make up a block group when stitch terminal end portions of adjacent blocks are not adjacent one another.

11. The embroidery data preparing device according to claim 9, further comprising running stitch preparing means for preparing stitch data from an end point of the first block group to a start point of the second block group when the stitch terminal end portions of said first and second block groups are adjacent one another.

12. The embroidery data preparing device according to claim 8, wherein each block is defined by opposing first and third sides and opposing second and fourth sides, with stitch points equidistant along the first and third sides based on stitch density and stitch points between the first and third sides occurring on equidistantly spaced oblique lines that intersect a line parallel to at least one of the first and third sides.

13. The embroidery data preparing device according to claim 12, wherein the equidistantly spaced lines in the first block group are continuous with the equidistantly spaced lines in the second block group.

14. The embroidery data preparing device according to claim 12, further comprising a stitch memory for storing the stitch data in stitch order.

15. The embroidery data preparing device according to claim 8, wherein said input device comprises a scanning device.

16. The embroidery data preparing device according to claim 8, further comprising an input port, wherein said input device is a computer connected to the embroidery data preparing device through said input port.

17. The embroidery preparing device according to claim 8, further comprising an output port which may be connected to a sewing machine.

18. The embroidery preparing device according to claim 8, further comprising a storage medium for storing stitch data prepared by first and second mat-type stitch data preparing means.

* * * * *